US012771384B2

(12) United States Patent
Subburaj et al.

(10) Patent No.: US 12,771,384 B2
(45) Date of Patent: Oct. 20, 2026

(54) INTERMEDIATE FREQUENCY AMPLIFIER WITH A CONFIGURABLE HIGH-PASS FILTER

(71) Applicant: TEXAS INSTRUMENTS INCORPORATED, Dallas, TX (US)

(72) Inventors: Karthik Subburaj, Bengaluru (IN); Pranav Sinha, Bengaluru (IN); Mayank Kumar Singh, Dallas, TX (US); Rittu Sachdev, Bengaluru (IN); Karan Singh Bhatia, Plano, TX (US); Shailesh Joshi, Bengaluru (IN); Indu Prathapan, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 323 days.

(21) Appl. No.: 18/668,397

(22) Filed: May 20, 2024

(65) Prior Publication Data

US 2024/0305321 A1 Sep. 12, 2024

Related U.S. Application Data

(63) Continuation of application No. 17/566,047, filed on Dec. 30, 2021, now Pat. No. 12,021,552.

(51) Int. Cl.
*H04B 1/00* (2006.01)
*H04B 1/04* (2006.01)
(Continued)

(52) U.S. Cl.
CPC ............ *H04B 1/0075* (2013.01); *H04B 1/04* (2013.01); *H04B 1/1036* (2013.01); *H04B 1/69* (2013.01);
(Continued)

(58) Field of Classification Search
CPC ...... H04B 1/0075; H04B 1/04; H04B 1/1036; H04B 1/69; H04B 2001/0408;
(Continued)

(56) References Cited

U.S. PATENT DOCUMENTS 3,576,564 A * 4/1971 Galvin .................... G01S 13/53 342/160
3,936,824 A * 2/1976 Aker ....................... G01S 13/92 342/115

(Continued)

FOREIGN PATENT DOCUMENTS

WO 2019193898 A1 10/2019

OTHER PUBLICATIONS

English Translation of WO-2019193898-A1, Inventor Murakami T, Oct. 2019—Year 2019.

*Primary Examiner* — Jinsong Hu
*Assistant Examiner* — Rui Meng Hu
(74) *Attorney, Agent, or Firm* — Michael T. Gabrik; Charles F. Koch

(57) ABSTRACT

In a radar system, an intermediate frequency amplifier (IFA) is configured with two high-pass filter stages, each having an amplifier and a configurable impedance component. A control signal is activated as the radar system begins to transmit a chirp signal to lower the impedance of the configurable impedance components during an initial portion of the chirp transmission to achieve faster settling of the IFA output signal. After the initial portion, the control signal deactivates while transmission of the chirp continues to increase the impedance of the configurable impedance components to a level sufficient to effectively perform filtering of unwanted signals received by the radar system.

20 Claims, 6 Drawing Sheets

(51) Int. Cl.
*H04B 1/10* (2006.01)
*H04B 1/69* (2011.01)

(52) U.S. Cl.
CPC ................ *H04B 2001/0408* (2013.01); *H04B 2001/1045* (2013.01); *H04B 2001/1063* (2013.01); *H04B 2001/6912* (2013.01)

(58) Field of Classification Search
CPC .... H04B 2001/1045; H04B 2001/1063; H04B 2001/6912; H03F 3/20; H03D 7/12; H03H 11/04; H03K 19/017545
See application file for complete search history.

(56) References Cited

U.S. PATENT DOCUMENTS

| | | | | | |
|---|---|---|---|---|---|
| 5,677,695 | A * | 10/1997 | Suzuki | G01S 7/4004 | 342/112 |
| 6,940,893 | B1 * | 9/2005 | Pinkney | H04B 1/69 | 370/441 |
| 2003/0016157 | A1 * | 1/2003 | Fullerton | H01Q 21/061 | 342/21 |
| 2006/0022866 | A1 * | 2/2006 | Walton | H01Q 21/08 | 342/126 |
| 2008/0094274 | A1 * | 4/2008 | Nakanishi | G01S 7/023 | 342/91 |
| 2011/0122017 | A1 * | 5/2011 | Vacanti | G01S 7/038 | 342/175 |
| 2011/0279306 | A1 * | 11/2011 | Mouknatjou | G01S 13/103 | 342/124 |
| 2013/0342383 | A1 * | 12/2013 | Kojima | G01S 13/28 | 342/134 |
| 2015/0171793 | A1 * | 6/2015 | Regier | H03F 1/26 | 330/251 |
| 2015/0338507 | A1 * | 11/2015 | Oh | G01S 13/343 | 342/159 |
| 2016/0266239 | A1 * | 9/2016 | Pavao-Moreira | G01S 13/34 | |
| 2016/0277546 | A1 * | 9/2016 | Unhold | H03L 7/1976 | |
| 2017/0222673 | A1 * | 8/2017 | Ghajar | H04B 1/123 | |
| 2017/0285140 | A1 * | 10/2017 | Gupta | H03D 1/2245 | |
| 2018/0011180 | A1 * | 1/2018 | Warnick | G01S 13/06 | |
| 2018/0097522 | A1 * | 4/2018 | Chillara | H03L 7/0991 | |
| 2018/0115371 | A1 * | 4/2018 | Trotta | H04B 17/14 | |
| 2018/0123537 | A1 * | 5/2018 | Salle | H03L 7/08 | |
| 2019/0049556 | A1 * | 2/2019 | Steinbuch | G01S 13/42 | |
| 2019/0250246 | A1 * | 8/2019 | Murakami | H03D 7/00 | |
| 2019/0250264 | A1 * | 8/2019 | Belfiore | G01S 7/285 | |
| 2020/0072941 | A1 * | 3/2020 | Jansen | G01S 13/345 | |
| 2020/0174098 | A1 * | 6/2020 | Lang | G01S 7/4008 | |
| 2020/0264271 | A1 * | 8/2020 | Liu | G01S 7/34 | |
| 2020/0274563 | A1 * | 8/2020 | Bowles | H04B 1/123 | |
| 2020/0292659 | A1 * | 9/2020 | Bai | G01S 13/931 | |
| 2020/0317207 | A1 * | 10/2020 | Sloushch | B60W 50/14 | |
| 2020/0371200 | A1 * | 11/2020 | Kim | G01S 7/354 | |
| 2021/0080537 | A1 * | 3/2021 | Melzer | G01S 13/584 | |
| 2021/0149018 | A1 * | 5/2021 | Elad | G01S 7/35 | |
| 2021/0149019 | A1 * | 5/2021 | Subburaj | G01S 13/341 | |
| 2021/0165088 | A1 * | 6/2021 | Suzuki | G01S 7/4017 | |
| 2021/0255280 | A1 * | 8/2021 | Santra | A61B 5/024 | |
| 2021/0364622 | A1 * | 11/2021 | Roger | G01S 13/584 | |
| 2021/0396867 | A1 * | 12/2021 | Amihood | G01S 13/04 | |
| 2022/0003838 | A1 * | 1/2022 | Itkin | G01S 7/4021 | |
| 2022/0011423 | A1 * | 1/2022 | Li | G01S 13/32 | |
| 2022/0107388 | A1 * | 4/2022 | Vallee | G01S 7/032 | |
| 2022/0196796 | A1 * | 6/2022 | Fiore | G01S 13/581 | |
| 2022/0260702 | A1 * | 8/2022 | Vaishnav | G01S 13/584 | |
| 2022/0299601 | A1 * | 9/2022 | Jungmaier | G01S 7/032 | |
| 2023/0216528 | A1 * | 7/2023 | Subburaj | H04B 1/04 | 455/201 |
| 2024/0248169 | A1 * | 7/2024 | Ahmad | G01S 13/343 | |

* cited by examiner

INTERMEDIATE FREQUENCY AMPLIFIER WITH A CONFIGURABLE HIGH-PASS FILTER

CROSS-REFERENCE TO RELATED APPLICATION(S)

This application is a continuation of, and claims priority to, U.S. application Ser. No. 17/566,047, filed Dec. 30, 2021, the content of which is incorporated by reference herein in its entirety.

BACKGROUND

In some radar systems, couplings between the transmitter and receiver antennas cause a high-power, low-frequency blocker signal to be generated in the resulting intermediate frequency signal. Intermediate frequency amplifiers can include a high-pass filter to remove the blocker signal. However, the high-pass filter can slow the settling of the intermediate frequency signal after turn-on, wasting additional samples of the analog-to-digital converter. The long settling time prevents fast chirp repetitions for detecting fast-moving targets and wastes radar frequency bandwidth while waiting for the intermediate frequency signal to settle.

SUMMARY

In an example, a circuit comprises analog circuitry configured to transmit a transmit signal, receive a reflected signal based on the transmit signal, and generate a result signal; and amplifying circuitry having an input configured to receive the result signal and having an output. The amplifying circuitry includes a first high-pass filter stage having an input coupled to the output of the amplifying circuitry and having an output coupled to the input of the amplifying circuitry; and a second high-pass filter stage having an input coupled to the output of the first high-pass filter stage and having an output coupled to the input of the amplifying circuitry. At least one of the first high-pass filter stage and the second high-pass filter stage includes an amplifier having an input and a resistor stage coupled to the input of the amplifier, the resistor stage including a switch, a first resistor that is trimmable and a second resistor selectively couplable in parallel with the first resistor by the switch. The circuit is configured to activate a control signal to cause the switch to close and the first resistor to be set at a first resistance for an initial period of time starting from when the analog circuitry begins to transmit the transmit signal, in which the control signal remains activated, the switch remains closed and the first resistance of the first resistor is maintained for the initial period of time, and deactivate the control signal at an end of the initial period of time to cause the switch to open and the first resistor to be set at a second resistance that is greater than the first resistance, the analog circuitry continuing to transmit the transmit signal after the control signal is deactivated until transmission of the transmit signal is complete.

In another example, an amplifier circuit comprises a first high-pass filter stage having an input coupled to an output of the amplifier circuit, in which the first high-pass filter stage includes a first amplifier having an input and an output, and a first resistor stage coupled to the input of the first amplifier, the first resistor stage including a first trimmable resistor and a first fixed resistor, and a first switch configured to selectively couple the first trimmable resistor and the first fixed resistor in parallel. The amplifier circuit further comprises a second high-pass filter stage having an input coupled to the output of the first high-pass filter stage, in which the second high-pass filter stage includes a second amplifier having an input and an output, and a second resistor stage coupled to the input of the second amplifier, the second resistor stage including a second trimmable resistor and a second fixed resistor, and a second switch configured to selectively couple the second trimmable resistor and the second fixed resistor in parallel. In response to activation of a control signal, the first and second switches are configured to close and the first and second trimmable resistors are configured to be set at a first resistance for an initial period of time, and, in response to deactivation of the control signal at an end of the initial period of time, the first and second switches are configured to open and the first and second trimmable resistors are configured to be set at a second resistance that is greater than the first resistance.

In still another example, a radar device comprises transmitter circuitry configured to generate and transmit a chirp signal; receiver circuitry configured to receive a reflected signal based on the chirp signal; a mixer coupled to the transmitter circuitry and the receiver circuitry and configured to generate a mixed signal based on the chirp signal and the reflected signal; and an intermediate frequency amplifier (IFA) having an input node configured to receive the mixed signal, and an output node. The IFA includes a first high-pass filter stage having an input coupled to the output node, and an output coupled to the input node, the first high-pass filter stage including a first amplifier and a first configurable impedance component; and a second high-pass filter stage having an input coupled to the output of the first high-pass filter stage and an output coupled to the input node, the second high-pass filter stage including a second amplifier and a second configurable impedance component. The radar device is configured to activate a control signal to cause the first and second configurable impedance components to provide a first impedance for an initial period of time starting from when the transmitter circuitry begins to transmit the chirp signal, in which the control signal remains activated and the first impedance of the first and second configurable impedance components is maintained for the initial period of time, and deactivate the control signal at an end of the initial period of time to cause the first and second configurable impedance components to provide a second impedance that is greater than the first impedance, the transmitter circuitry continuing to transmit the chirp signal after the control signal is deactivated until transmission of the chirp signal is complete.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

The described intermediate frequency amplifier includes a configurable high-pass filter with a first cutoff frequency during a first portion of a radar chirp signal while the output signal of the intermediate frequency amplifier settles, and a second cutoff frequency during a second portion of the radar chirp signal after the output signal settles. The first cutoff frequency is greater than the second cutoff frequency and chosen based on a frequency of a blocker signal introduced by couplings between the transmitter and receiver antennas.

Figure 1:
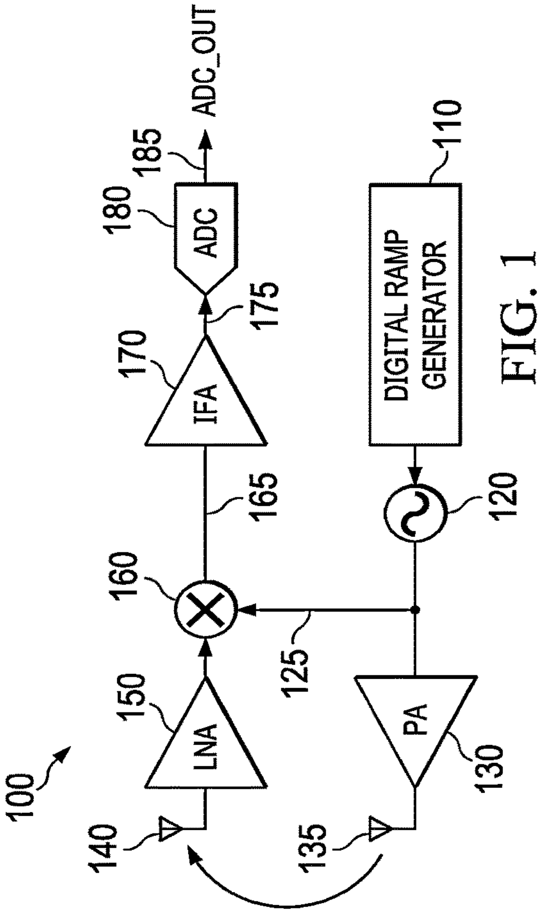
FIG. 1 illustrates a block diagram of an example radar system.

FIG. 1 illustrates a block diagram of an example radar system 100. Radar system 100 may be used in a vehicle, such as for a driver assistance system in an automobile. In this example, radar system 100 includes a digital ramp generator 110, an oscillator 120, a power amplifier (PA) 130, a transmitter (TX) antenna 135, a receiver (RX) antenna 140, a low-noise amplifier (LNA) 150, a mixer 160, an intermediate frequency amplifier (IFA) 170, and an analog-to-digital converter (ADC) 180. The digital ramp generator 110 generates a continuous wave signal and provides it to the oscillator 120, which can be a voltage-controlled oscillator.

The oscillator 120 frequency modulates the continuous signal from the digital ramp generator 110 resulting in a frequency modulated continuous wave (FMCW) signal 125 comprising a series of chirps. The FMCW signal 125 is provided to the PA 130, which amplifies it and provides it to the TX antenna 135, which transmits the radar chirps. The RX antenna 140 receives signals reflected from objects in the path of the transmitted chirp signals and provides them to the LNA 150, which amplifies the received signals. In the example radar system 100, the TX antenna 135 and the RX antenna 140 are stationary. In other examples, the antennas may be configured to transmit and receive across a range of area, such as by mechanical movement.

The amplified signal from the LNA 150 is provided to the mixer 160, as well as the FMCW signal 125, which provides the mixed signal output 165 to the IFA 170. The IFA 170 generates an intermediate frequency signal 175, and provides it to the ADC 180, which digitizes the signal and outputs a digital signal ADC_OUT 185.

FMCW radar, also referred to as continuous-wave frequency-modulated (CWFM) radar, is capable of determining distance, velocity, and angle of arrival. In a FMCW system, the transmitted chirp signal of a known stable-frequency continuous wave varies up and down in frequency over a fixed period of time by a modulating signal. Received reflections are then mixed with the transmitted chirp signal to produce a received beat signal 165, which will give the distance, velocity, and angle of arrival for the target object after signal processing. Frequency differences between the received reflections and the transmitted chirp signal increase with delay between transmission and reception and are therefore proportional to distance.

The phase differences between the received reflections across consecutive chirps allow the velocity of target objects to be computed. The phase differences between the received reflections at a first receiver antenna and the received reflections at a second receiver antenna allow the angle of arrival of target objects to be computed. Thus with an FMCW radar system, the distance between the target object and the radar system, relative velocity of the target object, relative angle of the target object and the like can be calculated.

During normal operation, linear frequency chirps are transmitted, and reflected signals are received. In an example, the receiver and transmitter are arranged as a homodyne system so that the received reflections are down-converted directly into the baseband using a copy of the transmitted signal from oscillator 120. The baseband signals are then filtered and amplified by filters and variable gain amplifiers such as those included in IFA 170. After ADC 180 converts the baseband signals into the digital domain, time domain to frequency domain transforms such as fast Fourier transforms (FFTs) may be applied and other signal processing performed in order to determine the distance, velocity, and angle of arrival between the target object and the radar system 100.

For example, the down-converted and digitized received signal corresponding to each chirp is first transformed using an FFT (called the range FFT). The range FFT produces a series of range bins with the value of each range bin denoting the signal strength of reflected targets at the corresponding range. A Doppler FFT is then performed for each range bin across all the chirps in a frame to estimate the velocities of reflected targets.

Figure 2:
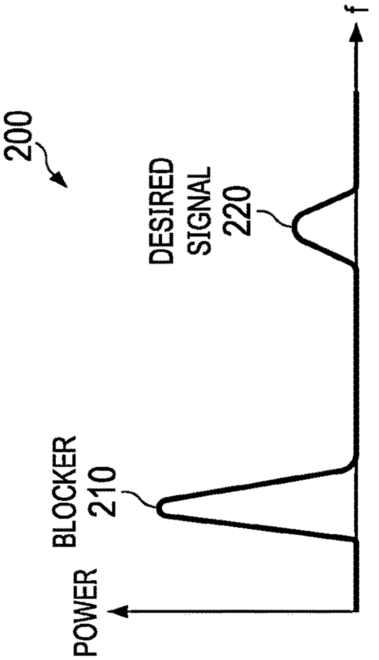
FIG. 2 shows the frequency spectrum of the output signal from the mixer in the example radar system shown in FIG. 1.

TX-RX couplings between the antennas can cause a high-power, low-frequency blocker signal to be generated in the mixer output signal 165. FIG. 2 shows the frequency spectrum 200 of the output signal 165 from the mixer 160, including the blocker signal 210 and the desired signal 220. The IFA 170 includes a high pass filter to remove the blocker signal 210. In some radar systems, the analog radar components are turned off between radar chirps to conserve power, and at turn-on for each radar chirp, the high pass filter leads to slow settling of the ADC_OUT 185, causing several microseconds (μs) of ADC_OUT 185 to be wasted. The long settling time prevents fast chirp repetitions for detecting fast moving targets and wastes radar frequency bandwidth while waiting for the settling.

Figure 3:
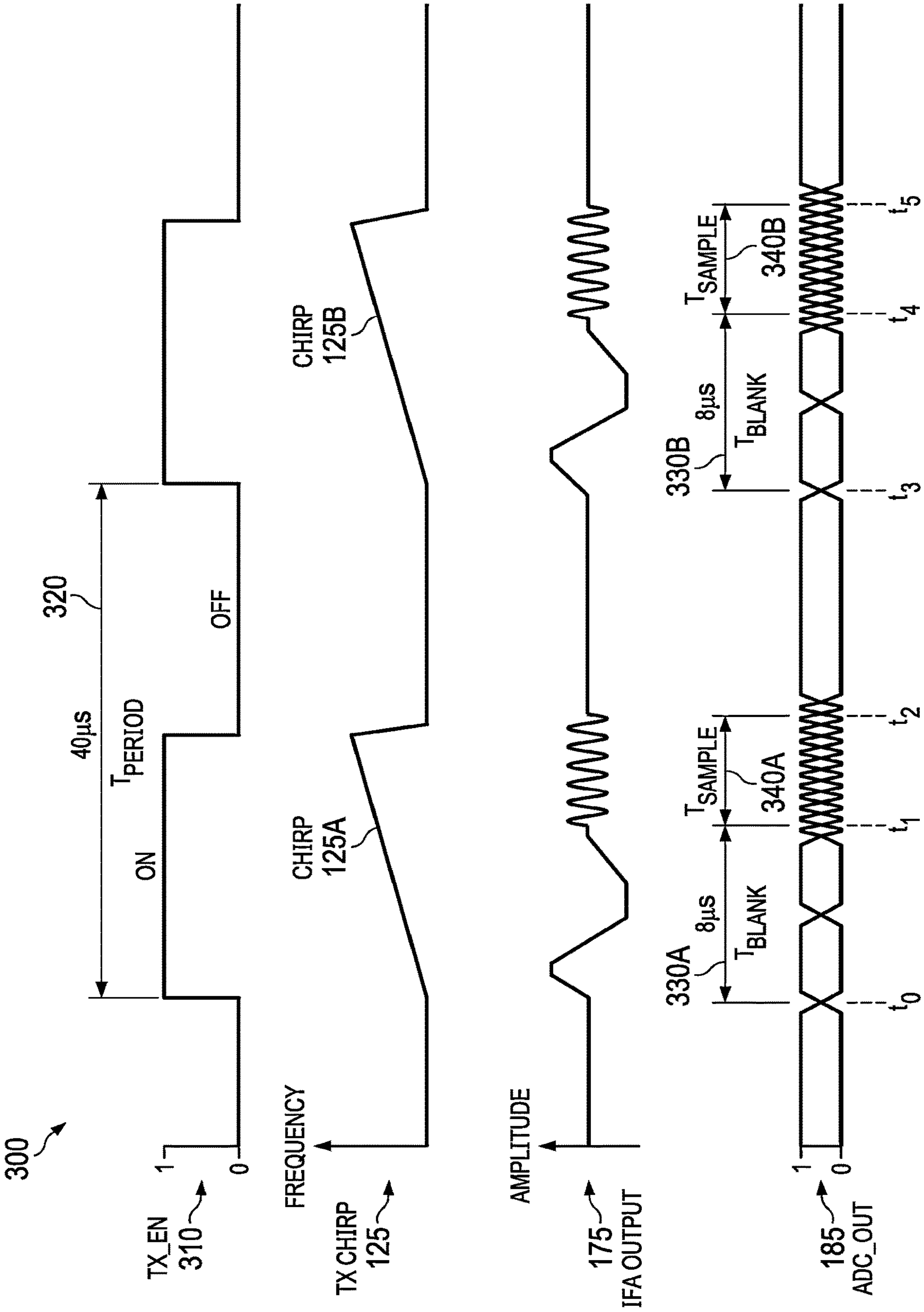
FIG. 3 shows waveforms of signals in the example radar system shown in FIG. 1.

FIG. 3 shows waveforms of signals in the example radar system 100 shown in FIG. 1. The enable signal TX_EN 310 has a period Tperiod 320 of approximately 40 us in this example and turns on and off the analog components in the radar system 100, including the PA 130, the LNA 150, the mixer 160, and the IFA 170. The TX chirp signal 125 is generated by the oscillator 120 and includes two chirp signals: chirp 125A and chirp 125B. For example, the chirp signals 125A and 125B may begin at 76 GigaHerz (GHz) and increase to 77 GHz in this implementation, corresponding to a 1 GHz bandwidth. The IFA output 175 is the intermediate frequency signal generated by the IFA 170, and the ADC_OUT 185 is the output signal generated by the ADC 180 based on the IFA output 175. At time t0, the TX_EN 310 goes logic high, causing the PA 130, the LNA 150, the mixer 160, and the IFA 170 to turn on.

As the chirp 125A is generated, the high pass filter in the IFA 170 causes the IFA output 175 to be irregular, and the ADC_OUT 185 is wasted until time t1, at which the IFA output 175 settles and the ADC_OUT 185 takes meaningful digital samples of the IFA output 175. The length of time Tblank 330A between t0 and t1 is approximately 8 us in this example. At time t2, the enable signal TX_EN 310 goes logic low, causing the PA 130, the LNA 150, the mixer 160, and the IFA 170 to turn off. During the length of time Tsample 340A between t1 and t2, the ADC_OUT 185 is able to take meaningful digital samples of the settled IFA output 175.

Figure 4:
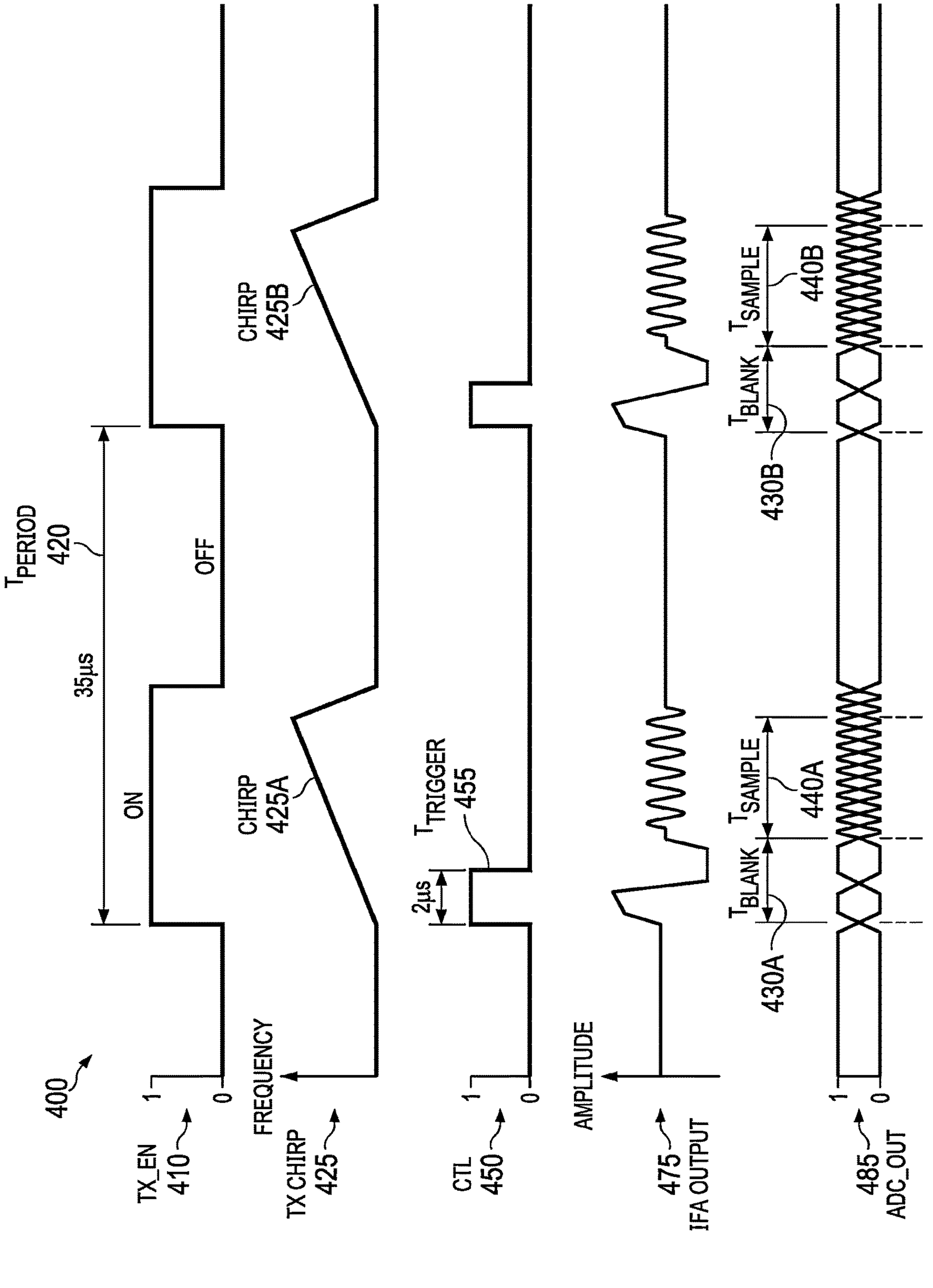
FIG. 4 shows waveforms of signals in an example radar system with a configurable high pass filter in the intermediate frequency amplifier.

FIG. 4 shows waveforms 400 of signals in an example radar system with a configurable high pass filter in the IFA. For ease of illustration, the signals shown herein are discussed with respect to the radar system 100 shown in FIG. 1. The enable signal TX_EN 410 is similar to the enable signal TX_EN 310 shown in FIG. 3, and has a period Tperiod 420 of approximately 35 us in this example. The length of Tperiod 420 may be reduced because of the improved settling time of IFA output 475, as explained below. The TX chirp signal 425 is similar to the TX chirp signal 125 shown in FIG. 3, but the TX chirp signals 425A and 425B may begin at 76.1 GHz and increase to 77 GHZ, corresponding to 900 MegaHerz (MHz) bandwidth. The control signal CTL 450 is a dynamic bandwidth selection signal used to increase the high pass filter cutoff for the configurable high pass filter included in the IFA for an initial period of time after turn-on. In the context of the frequency spectrum 200 of the output signal 165 shown in FIG. 2, the increased cutoff frequency causes the high pass filter in the IFA to filter out the blocker signal 210 at lower frequencies while maintaining the desired signal 220 at higher frequencies.

The IFA output 475 is the intermediate frequency signal generated by the IFA with a configurable high pass filter, and the ADC_OUT 485 is the output signal generated by the ADC 180 based on the IFA output 475. At time to, the TX_EN 410 goes logic high, causing the PA 130, the LNA 150, the mixer 160, and the IFA with a configurable high pass filter to turn on. The control signal CTL 450 goes logic high for an initial period of time Ttrigger 455, adjusting the filter cutoff in the IFA and causing the IFA output 475 based on the chirp signal 425 to settle faster than the IFA output 175 shown in FIG. 3, at time t1. The initial period of time Ttrigger 455 is approximately 2 us in this example.

As a result, less of the ADC_OUT 485 is wasted during the length of time Tblank 430A between t0 and t1, which is approximately 3 us in this example. At time t2, the enable signal TX_EN 410 goes logic low, causing the PA 130, the LNA 150, the mixer 160, and the IFA with a configurable high pass filter to turn off. During the length of time Tsample 440A between t1 and t2, the ADC_OUT 485 is able to take meaningful digital samples of the settled IFA output 475. Because the IFA output 475 settles approximately 5 us quicker than the IFA output 175, the period Tperiod 420 of the TX_EN signal 410 is approximately 5 us shorter than the Tperiod 320 of the TX_EN signal 310 shown in FIG. 3, and the bandwidth of the chirps 425A and 425B is approximately 100 MHz shorter than the bandwidth of the chirps 125A and 125B shown in FIG. 3. The shorter period Tperiod 420 and bandwidth of chirps 425A and 425B enable faster chirp repetition and allow the radar system to detect faster objects.

The ADC_OUT 485 samples are used to determine the presence, distance, velocity, and direction of objects around the radar apparatus, as described herein with respect to FIG. 1. For example, two-dimensional FFTs may be performed on ADC samples from each of the chirps 425A, 425B, etc. to determine the presence, distance, and velocity of objects, and for multiple receivers to determine the direction of objects.

Figure 5:
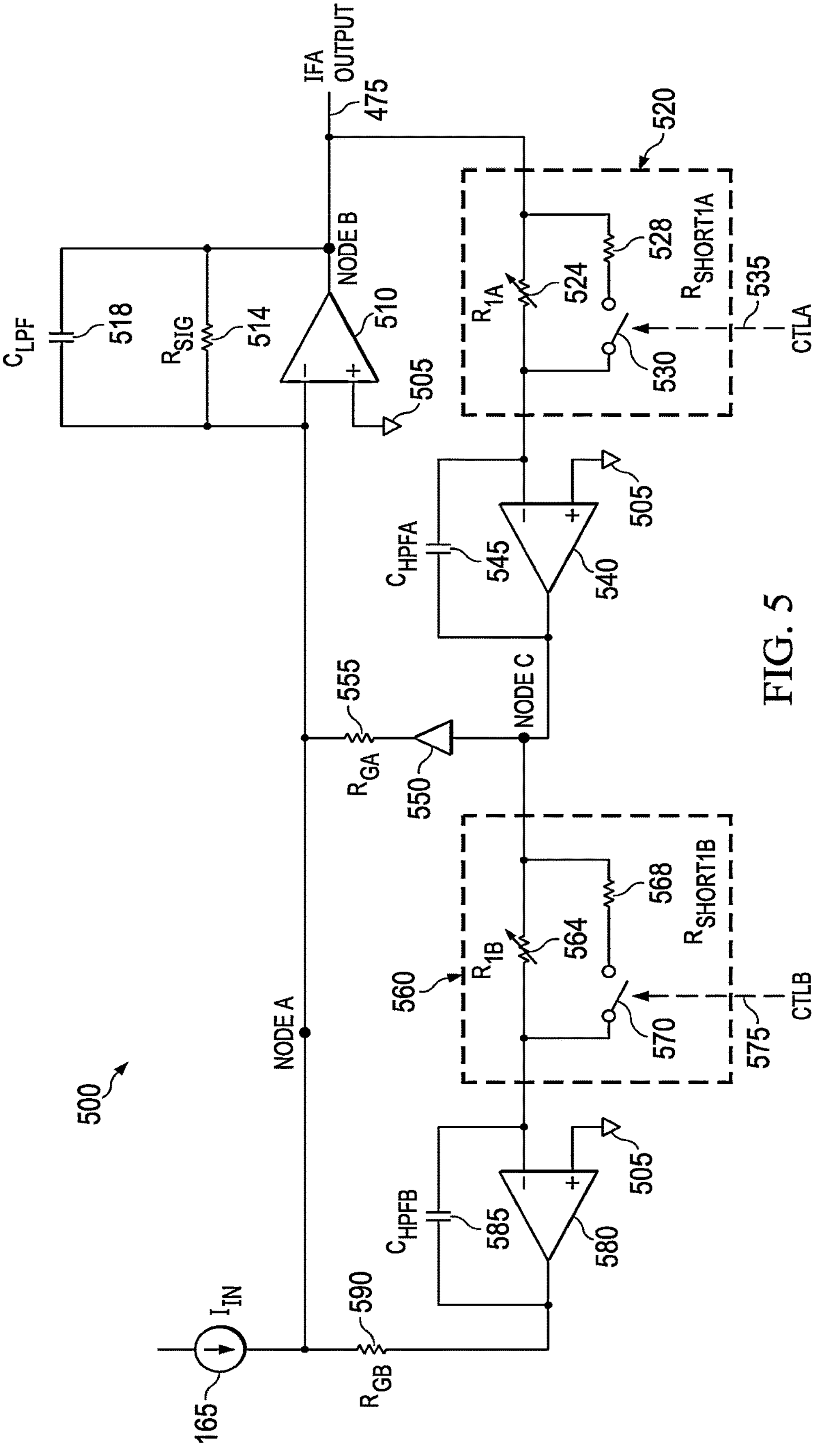
FIG. 5 shows an example intermediate frequency amplifier with a configurable high pass filter.

FIG. 5 shows an example intermediate frequency amplifier 500 with a configurable high pass filter. The IFA 500 may be used in place of IFA 170 in radar system 100 and is described herein with respect to the radar system 100 shown in FIG. 1. IFA 500 includes amplifiers 510, 540, and 580; resistors Rsig 514, R1*a* 524, Rshort1*a* 528, Rga 555, R1*b* 564, Rshort1*b* 568, and Rgb 590; capacitors Clpf 518, Chpfa 545, and Chpfb 585; buffer 550; and switches 530 and 570. In some examples, resistors R1*a* 524 and R1*b* 564 are variable resistors. An input node A receives the signal lin 165 output from mixer 160 in the radar system 100, and an output node B provides the output signal IFA output 475, described herein with reference to FIG. 4, to the ADC 180.

The resistors Rgb 590 and Rga 555, as well as the negative input of the amplifier 510, are coupled to the input node A. The positive input of the amplifier 510 is coupled to ground 505. The output of amplifier 510 is coupled to the output node B. The resistor Rsig 514 and the capacitor Clpf 518 are coupled in parallel between the negative input of amplifier 510 and the output of amplifier 510. A first resistor stage 520 is coupled to the output node B, and includes the resistors R1*a* 524 and Rshort1*a* 528 and switch 530. In the first resistor stage 520, resistors R1*a* 524 and Rshort1*a* 528 are coupled together in parallel between the input of the first resistor stage 520, coupled to output node B, and the output of the first resistor stage 520, which is further coupled to the negative input of the amplifier 540.

The switch 530 is coupled between the resistor Rshort1*a* 528 and the output of the first resistor stage 520 and is configured to open and close based on the control signal CTLA 535. The control signal CTLA 535 is generated based on the dynamic bandwidth selection signal CTL 450 shown in FIG. 4, and causes the switch 530 to be closed while CTL 450 indicates the cutoff frequency of the high pass filter should be increased during the initial period of time Ttrigger 455 after turn-on, coupling the resistor Rshort1*a* 528 in parallel with resistor R1*a* 524 and reducing the overall resistance of the first resistor stage 520. The reduced resistance of the first resistor stage 520 enables faster small signal settling and a better slew rate for the IFA 500. While CTL 450 indicates the cutoff frequency of the high pass filter should be decreased after the initial period of time Ttrigger 455, the control signal CTLA 535 causes the switch 530 to be open, uncoupling the resistor Rshort1*a* 528 from resistor R1*a* 524, increasing the overall resistance of the first resistor stage 520. The resistance of R1*a* 524 can be varied to ensure the stability of IFA 500 across different gain settings.

The capacitor Chpfa 545 is coupled between the negative input of the amplifier 540 and the output of the amplifier 540, which is coupled to node C. The positive input of the amplifier 540 is coupled to ground 505. The input of the buffer 550 is coupled to the node C, and the output of the buffer 550 is coupled to the resistor Rga 555. The second resistor stage 560 has an input coupled to node C and includes the resistors R1*b* 564 and Rshort1*b* 568 and switch 570. Resistors R1*b* 564 and Rshort1*b* 568 are coupled together in parallel between the input of the second resistor stage 560, coupled to node C, and the output of the second resistor stage 560, which is further coupled to the negative input of the amplifier 580.

The switch 570 is coupled between the resistor Rshort1*b* 568 and the output of the second resistor stage 560 and is configured to open and close based on the control signal CTLB 575. The control signal CTLB 575 is generated based on the dynamic bandwidth selection signal CTL 450 shown in FIG. 4, and causes the switch 570 to be closed while CTL 450 indicates the cutoff frequency of the high pass filter should be increased during the initial period of time Ttrigger 455 after turn on, coupling the resistor Rshort1*b* 568 in parallel with resistor R1*b* 564 and reducing the overall resistance of the second resistor stage 560. The reduced resistance of the second resistor stage 560 enables faster small signal settling and a better slew rate for the IFA 500. While CTL 450 indicates the cutoff frequency of the high pass filter should be decreased after the initial period of time Ttrigger 455, the control signal CTLB 575 causes the switch 570 to be open, uncoupling the resistor Rshort1*b* 568 from resistor R1*b* 564, increasing the overall resistance of the second resistor stage 560. The resistance of R1*b* 564 can be varied to ensure the stability of IFA 500 across different gain settings. The capacitor Chpfb 585 is coupled between the negative input of the amplifier 580 and the output of the amplifier 580. The positive input of the amplifier 580 is coupled to ground 505.

The output of the amplifier 580 is coupled to the resistor Rgb 590. In other implementations, the resistance of the resistors Rga 455 and Rgb 490 can be varied to increase the high pass filter cutoff frequency as well as the variations in the overall resistance of the first resistor stage 520 and the second resistor stage 560, although variations in the resistances of Rga 555 and Rgb 590 do not affect the slew rate of the IFA 500. In other implementations, the capacitances of Chpfa 545 and Chpfb 585 can be varied to increase the high pass filter cutoff frequency and improve the slew rate of the IFA 500. However, varying the capacitances of Chpfa 545 and Chpfb 585 leads to additional resettling after the high bandwidth configuration is exited.

Figure 6:
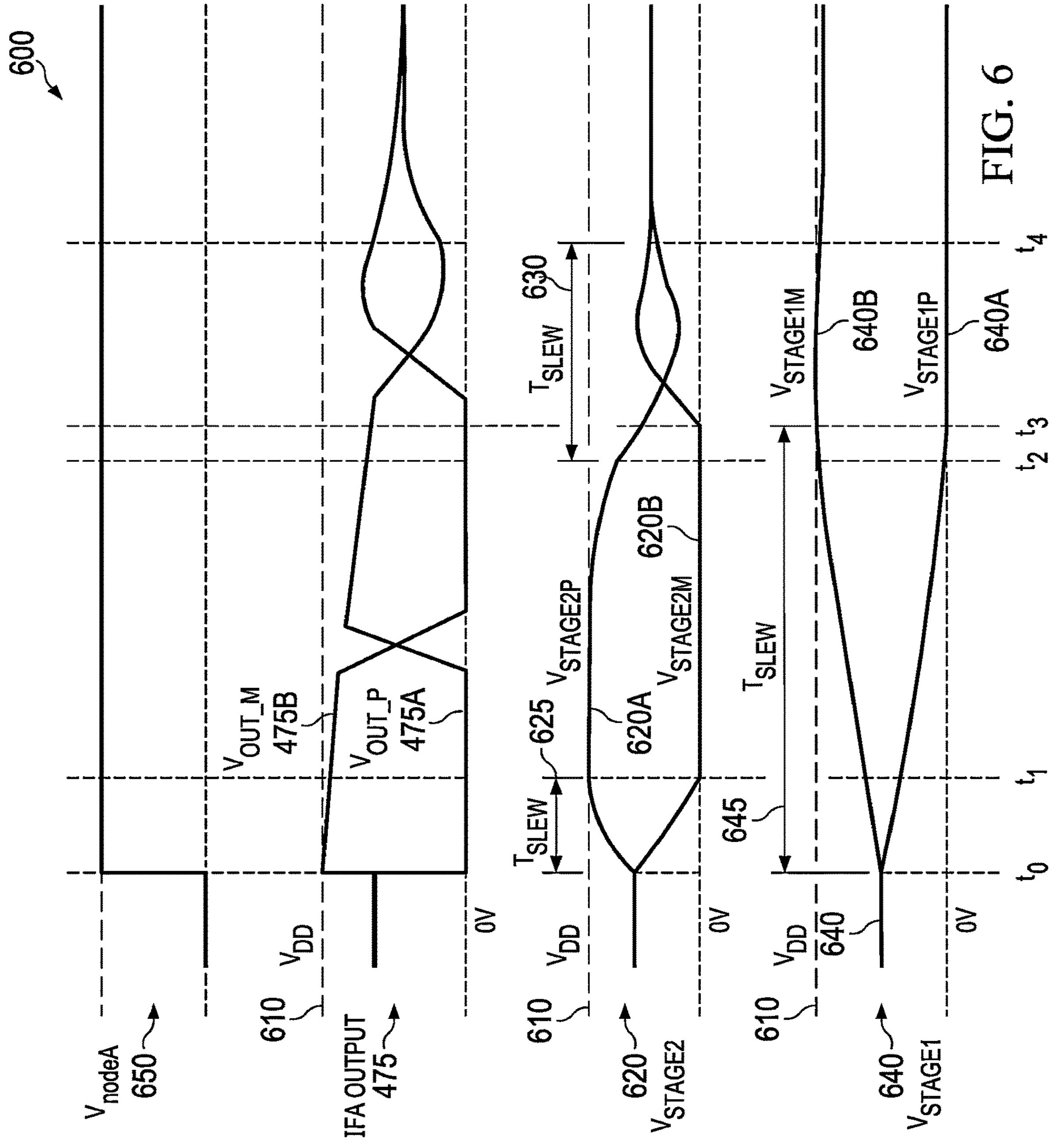
FIG. 6 shows waveforms of signals in the example intermediate frequency amplifier with a configurable high pass filter shown in FIG. 5.

FIG. 6 shows waveforms 600 of signals in the example IFA 500 shown in FIG. 5. A voltage on node A due to the current Iin 165 input to the IFA 500 from the mixer 160 is represented as VnodeA 650, and increases in a step function at time to. The differential output voltage of IFA output 475 comprises a positive Vout_P 475A and a negative Vout_M 475B, the absolute value of which is shown in the waveforms 600. At time to, Vout_P 475A and Vout_M 475B of the IFA output 475 begin oscillating between 0 volts (V) and the supply voltage Vdd 610 before settling at time t4.

The voltage V_stage2 620 represents the voltage on node C, at the output of the second order stage including the amplifier 540, the capacitor Chpfa 545, and the first resistor stage 520. The differential voltage V_stage2 620 comprises a positive V_stage2P 620A and a negative V_stage2M 620B, the absolute value of which is shown in the waveforms 600. Between time to and t1, the period Tslew 625, the voltage V_stage2P 620A increases to the supply voltage Vdd 610, and the voltage V_stage2M 620B decreases to 0V. Between time t2 and t4, the period Tslew 630, the voltage V_stage2P 620A and V_stage2M 620B oscillate before settling at time t4.

The voltage V_stage1 640 represents the voltage at the output of amplifier 580, the output of the first order stage including the amplifier 580, the capacitor Chpfb 585, and the second resistor stage 560. The differential voltage V_stage1 640 comprises a positive V_stage1P 640A and a negative V_stage1M 640B, the absolute value of which is shown in the waveforms 600. Between time to and t3, the period Tslew 645, the voltage V_stage1M 640B increases to the supply voltage Vdd 610, and the voltage V_stage1P 640A decreases to 0V. At time t3, the voltage V_stage1 640 settles. The time between to and t4 is the length of time Ttrigger 455 during which CTL 450 indicates the cutoff frequency of the high pass filter in IFA 500 should be increased and CTLA 535 and CTLB 575 cause the switches 530 and 570, respectively, to be closed, reducing the overall resistances of resistance stages 520 and 560. In some examples, the IFA output 475 settles in approximately 2 μs.

Figure 7:
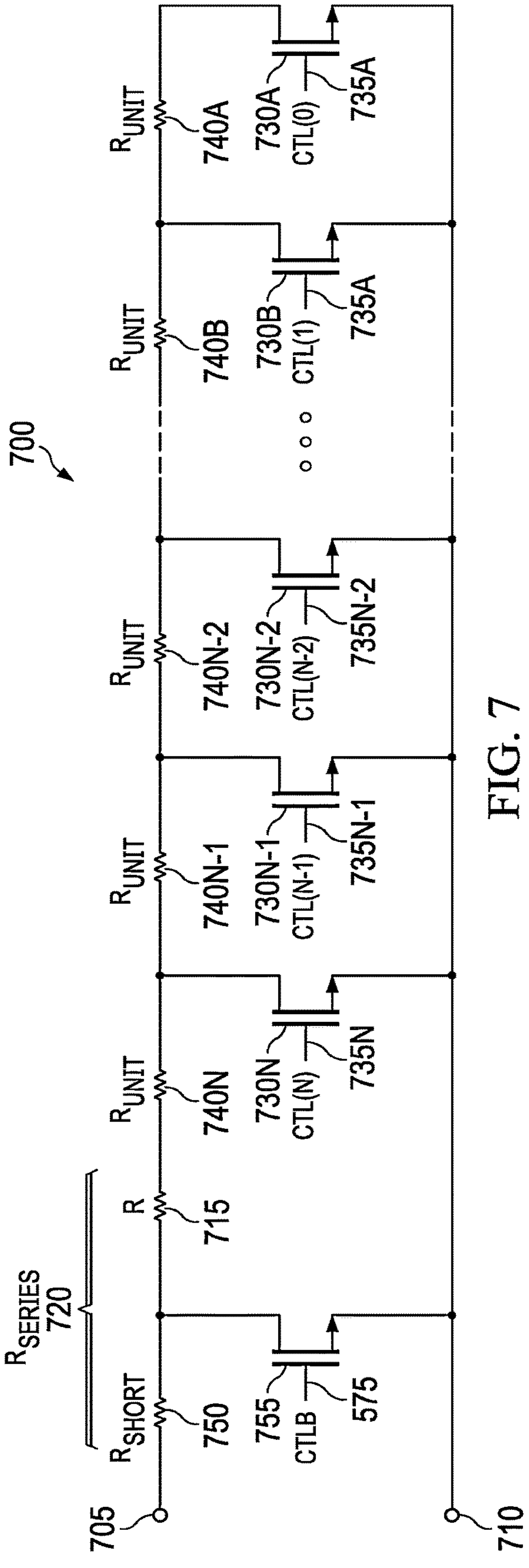
FIG. 7 shows an example series trimmed resistor for use in the first order high pass filter in the intermediate frequency amplifier shown in FIG. 5.

FIG. 7 shows an example series trimmed resistor 700 for use as variable resistor R1*b* 564 of the second resistor stage 560 in the first order high pass filter in the intermediate frequency amplifier 500 shown in FIG. 5. The series trimmed resistor 700 includes the resistor Rshort 750 and resistor R 715, as well as a number N of resistors Runit 740A-N; a transistor 755, and a number N of transistors 730A-N. The transistors 755 and 730A-N are metal oxide semiconductor field-effect transistors (MOSFETs) and are n-type MOSFETS (NMOS) in this example. In other examples, one or more of transistors 755 and 730A-N are p-type MOSFETs (PMOS) or bipolar junction transistors (BJTs). A BJT includes a base corresponding to the gate terminal of a MOSFET, and a collector and an emitter corresponding to the drain and source terminals of a MOSFET. The base of a BJT and the gate terminal of a MOSFET are also called control inputs. The collector and emitter of a BJT and the drain and source terminals of a MOSFET are also called current terminals.

The terminal 705 is coupled to node C in the IFA 500 and the terminal 710 is coupled to the negative input of the amplifier 580 in the IFA 500. The resistor Rshort 750 is coupled to the terminal 705 and to the drain terminal of transistor 755. The source terminal of transistor 755 is coupled to terminal 710, and the gate terminal of transistor 755 is configured to receive the control signal CTLB 575, which is generated based on the control signal CTL 450 as described in FIG. 4. The resistor R 715 is coupled to the resistor Rshort 750 and the drain terminal of transistor 755. The transistor 755 and the resistors Rshort750 and R 715 comprise the stage Rseries 720.

The resistor Runit 740N is coupled to the resistor R 715 and to the drain terminal of the transistor 730N. The gate terminal of transistor 730N is configured to receive the control signal CTL(N) 735N, and the source terminal of transistor 730N is coupled to the terminal 750. Similarly, the resistor Runit 740N-1 is coupled to the resistor Runit 740N and to the drain terminal of transistor 730N-1. The gate terminal of transistor 730N-1 is configured to receive the control signal CTL(N−1) 735N-1, and the source terminal of transistor 730N-1 is coupled to the terminal 750.

Each of resistors Runit 740N-2 through 740A and transistors 730N-2 through 730A are similarly configured in stages, such that the overall resistance of the series trimmed resistor 700 can be tailored to the desired value for the particular implementation. During the initial period Ttrigger 455, the control signal CTLB 575 causes the transistor 755 to act as a closed switch, decreasing the overall resistance of the series trimmed resistor 700 acting as R1*b* 564 and further reducing the effective resistance of the second resistor stage 560. The control signals CTL(N) 735N through CTL(0) 735A are chosen to set the desired resistance of R1*b* 564, such that the IFA 500 remains stable across different gain settings. For example, the digital ramp generator 110 shown in FIG. 1 can act as a controller and be further configured to adjust a gain setting of the IFA 500 to a desired gain for the particular implementation and enable or disable one or more control signals CTL 735A-N to increase or decrease the effective resistance of the series trimmed resistor 700 acting as resistor R1*b* 564 in the second resistor stage 560.

Figure 8:
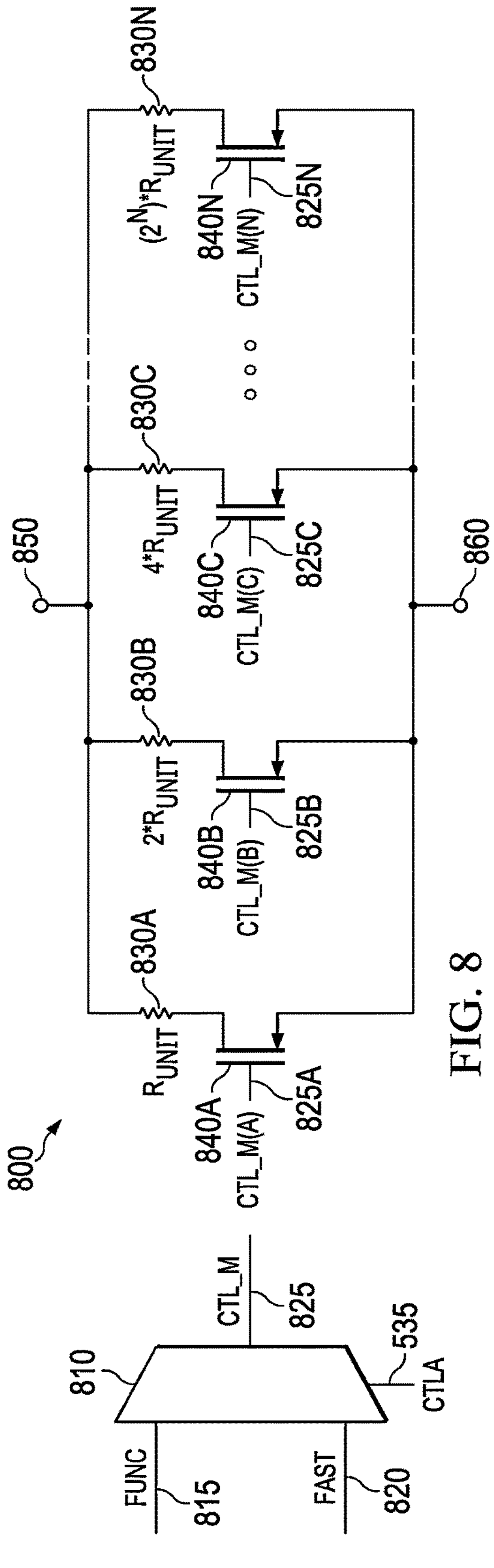
FIG. 8 shows an example parallel trimmed resistor for use in the second order high pass filter in the intermediate frequency amplifier shown in FIG. 5.

FIG. 8 shows an example parallel trimmed resistor 800 for use as resistor R1*a* 524 in resistor stage 520 of the second order high pass filter in the IFA 500 shown in FIG. 5. The parallel trimmed resistor 800 includes a multiplexor 810, a number N of resistors 830A-N, and transistors 840A-N. The transistors 840A-N are NMOS in this example. In other examples, one or more of transistors 840A-N are PMOS or BJTs. The multiplexor 810 is shown as a multiplexor in this example, but any appropriate selector logic circuit may be used.

The multiplexor 810 has a first input for a first functional trim signal FUNC 815 and a second input for a second fast trim signal FAST 820. The FUNC signal 815 and the FAST signal 820 act as control signals for the transistors 840A-N to couple more or fewer of the resistors 830A-N in parallel. The FUNC signal 815 is configured to set a value of the parallel trimmed resistor 800 during a normal mode of operation, and the FAST signal 820 is configured to set a value of the parallel trimmed resistor 800 during the initial period Ttrigger 455.

The multiplexor 810 is configured to output the control signal CTL_M 825 based on the control signal CTLA 535. For example during the initial period Ttrigger 455, the control signal CTLA 535 causes the multiplexor 810 to output the FAST signal 820 as the control signal CTL_M 825. The FAST signal 820 can reduce the overall resistance of parallel trimmed resistor 800 acting as R1*a* 524 and further reducing the effective resistance of the first resistor stage 520. After the initial period Ttrigger 455, the control signal CTLA 535 causes the multiplexor 810 to output the FUNC signal 815 as the control signal CTL_M 825. In some implementations, CTL_M 825 is an N-bit signal, with each of the N bits indicating the intended state of the corresponding transistor 830.

The source terminals of transistors 840A-N are coupled to terminal 860, which may be coupled to node B in the IFA 500 at the input of the first resistor stage 520. The drain terminals of transistors 840A-N are coupled to the resistors 830A-N, respectively, which are further coupled to terminal 850. Terminal 850 may be coupled to the negative input of the amplifier 540 at the output of the first resistor stage 520. The gate terminals of transistors 840A-N are configured to receive the control signal CTL_M 825, which causes the transistors 840A-N to turn on or off based on the state of the corresponding bit of CTL_M 825. In some implementations, the resistance of the resistor 830A is a value Runit, the resistance of the resistor 830B is 2*Runit, and so on, such that the resistance of the resistor 830N may be represented as:

$$(2^N)*Runit$$

The FUNC signal 815 can be chosen to set the desired resistance of R1*a* 524, such that IFA 500 remains stable across different gain settings. For example, the digital ramp generator 110 shown in FIG. 1 can act as a controller and be further configured to adjust a gain setting of the IFA 500 to a desired gain for the particular implementation. The digital ramp generator 110 can then enable or disable particular bits of FUNC signal 815 such that one or more of transistors 840A-N turn on or turn off, coupling or uncoupling the corresponding resistors 830A-N from the parallel trimmed resistor 800 acting as resistor R1*a* 524 in the first resistor stage 520.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-type metal-oxide-silicon field effect transistor ("MOSFET") may be used in place of an n-type MOSFET with little or no changes to the circuit. Furthermore, other types of transistors may be used (such as bipolar junction transistors (BJTs)).

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

Modifications are possible in the described embodiments, and other embodiments are possible, within the scope of the claims.

What is claimed is:

1. A circuit comprising:

analog circuitry configured to transmit a transmit signal, receive a reflected signal based on the transmit signal, and generate a result signal; and amplifying circuitry having an input configured to receive the result signal and having an output, the amplifying circuitry including:

a first high-pass filter stage having an input coupled to the output of the amplifying circuitry and having an output coupled to the input of the amplifying circuitry; and a second high-pass filter stage having an input coupled to the output of the first high-pass filter stage and having an output coupled to the input of the amplifying circuitry, wherein at least one of the first high-pass filter stage and the second high-pass filter stage includes an amplifier having an input and a resistor stage coupled to the input of the amplifier, the resistor stage including a switch, a first resistor that is trimmable and a second resistor selectively couplable in parallel with the first resistor by the switch, and wherein the circuit is configured to:

activate a control signal to cause the switch to close and the first resistor to be set at a first resistance for an initial period of time starting from when the analog circuitry begins to transmit the transmit signal, in which the control signal remains activated, the switch remains closed and the first resistance of the first resistor is maintained for the initial period of time, and deactivate the control signal at an end of the initial period of time to cause the switch to open and the first resistor to be set at a second resistance that is greater than the first resistance, the analog circuitry continuing to transmit the transmit signal after the control signal is deactivated until transmission of the transmit signal is complete.

2. The circuit of claim 1, wherein the analog circuitry includes transmitting circuitry that is configured to turn on when the control signal is activated.

3. The circuit of claim 1, wherein the at least one of the first high-pass filter stage and the second high-pass filter stage includes a capacitor coupled between the input of the amplifier and an output of the amplifier.

4. The circuit of claim 1, wherein the input of the amplifier is a negative input of the amplifier, the amplifier also having a positive input coupled to ground.

5. The circuit of claim 1, further comprising:

a buffer coupled between the output of the first high-pass filter stage and the input of the amplifying circuitry.

6. The circuit of claim 1, wherein the amplifying circuitry further includes a low-pass filter coupled between the input of the amplifying circuitry and an output of the amplifying circuitry.

7. The circuit of claim 1, wherein the circuit is a radar circuit, the transmit signal is a chirp signal and the result signal is a mixed signal based on the chirp signal and the reflected signal.

8. An amplifier circuit comprising:

a first high-pass filter stage having an input coupled to an output of the amplifier circuit, the first high-pass filter stage including:

a first amplifier having an input and an output, and a first resistor stage coupled to the input of the first amplifier, the first resistor stage including a first trimmable resistor and a first fixed resistor, and a first switch configured to selectively couple the first trimmable resistor and the first fixed resistor in parallel; and a second high-pass filter stage having an input coupled to the output of the first high-pass filter stage, the second high-pass filter stage including:

a second amplifier having an input and an output, and a second resistor stage coupled to the input of the second amplifier, the second resistor stage including a second trimmable resistor and a second fixed resistor, and a second switch configured to selectively couple the second trimmable resistor and the second fixed resistor in parallel;

wherein, in response to activation of a control signal, the first and second switches are configured to close and the first and second trimmable resistors are configured to be set at a first resistance for an initial period of time, and, in response to deactivation of the control signal at an end of the initial period of time, the first and second switches are configured to open and the first and second trimmable resistors are configured to be set at a second resistance that is greater than the first resistance.

9. The amplifier circuit of claim 8, wherein:

the first high-pass filter stage further includes a first capacitor coupled between the input and the output of the first amplifier; and the second high-pass filter stage further includes a second capacitor coupled between the input and the output of the second amplifier.

10. The amplifier circuit of claim 8, further comprising:

a third amplifier having an input coupled to the output of each of the first and second high-pass filter stages, the third amplifier having an output coupled to the input of the first high-pass filter stage.

11. The amplifier circuit of claim 10, further comprising:

a parallel resistive-capacitive circuit coupled between the input of the third amplifier and the output of the third amplifier.

12. The amplifier circuit of claim 10, further comprising:

a buffer coupled between the output of the first high-pass filter stage and the input of the third amplifier.

13. The amplifier circuit of claim 8, wherein:

the input of the first amplifier is a negative input, the first amplifier further having a positive input coupled to ground; and the input of the second amplifier is a negative input, the second amplifier further having a positive input coupled to ground.

14. A radar device comprising:

transmitter circuitry configured to generate and transmit a chirp signal;

receiver circuitry configured to receive a reflected signal based on the chirp signal;

a mixer coupled to the transmitter circuitry and the receiver circuitry and configured to generate a mixed signal based on the chirp signal and the reflected signal; and an intermediate frequency amplifier (IFA) having an input node configured to receive the mixed signal, and an output node, the IFA including:

a first high-pass filter stage having an input coupled to the output node, and an output coupled to the input node, the first high-pass filter stage including a first amplifier and a first configurable impedance component; and a second high-pass filter stage having an input coupled to the output of the first high-pass filter stage and an output coupled to the input node, the second high-pass filter stage including a second amplifier and a second configurable impedance component;

wherein the radar device is configured to:

activate a control signal to cause the first and second configurable impedance components to provide a first impedance for an initial period of time starting from when the transmitter circuitry begins to transmit the chirp signal, in which the control signal remains activated and the first impedance of the first and second configurable impedance components is maintained for the initial period of time, and deactivate the control signal at an end of the initial period of time to cause the first and second configurable impedance components to provide a second impedance that is greater than the first impedance, the transmitter circuitry continuing to transmit the chirp signal after the control signal is deactivated until transmission of the chirp signal is complete.

15. The radar device of claim 14, wherein the first configurable impedance component includes a first resistor that is trimmable coupled to an input of the first amplifier, a first switch, and a second resistor configured to be coupled in parallel with the first resistor via the first switch.

16. The radar device of claim 15, wherein the second configurable impedance component includes a third resistor that is trimmable coupled to an input of the second amplifier, a second switch, and a fourth resistor configured to be coupled in parallel with the third resistor.

17. The radar device of claim 14, wherein the radar circuit is configured to:

cause the first impedance configurable component to be set at a first impedance for an initial period of time starting from when the transmitter circuitry begins to transmit the chirp signal, in which the first impedance is maintained by the first configurable impedance component for the initial period of time, and cause the first configurable impedance component to be set at a second impedance that is greater than the first impedance, the transmitter circuitry continuing to transmit the chirp signal with the first configurable impedance component set at the second impedance until transmission of the chirp signal is complete.

18. The radar device of claim 17, wherein the radar circuit is further configured to:

cause the second configurable impedance component to be set at a first impedance for an initial period of time starting from when the transmitter circuitry begins to transmit the chirp signal, in which the first impedance is maintained by the second configurable impedance component for the initial period of time, and cause the first configurable impedance component to be set at a second impedance that is greater than the first impedance, the transmitter circuitry continuing to transmit the chirp signal with the first configurable impedance component set at the second impedance until transmission of the chirp signal is complete.

19. The radar device of claim 14, wherein the transmitter circuitry includes:

a digital ramp generator having an output and configured to generate a ramp signal;

an oscillator having an input coupled to the output of the digital ramp generator, and an output, wherein the oscillator is configured to generate a frequency modulated continuous wave (FMCW) signal;

a power amplifier having an input coupled to the output of the oscillator, and an output, wherein the power amplifier is configured to amplify the FMCW signal which includes the chirp signal; and a transmit antenna coupled to the power amplifier and configured to output the amplified FMCW signal.

20. The radar device of claim 19, wherein the receiver circuitry includes:

a receive antenna configured to receive the reflected signal; and a low noise amplifier having an input coupled to the receive antenna and having an output coupled to the mixer.

* * * * *